United States Patent
Ko et al.

(10) Patent No.: US 9,622,195 B2
(45) Date of Patent: Apr. 11, 2017

(54) APPARATUS AND METHOD FOR CONTROLLING TRANSMISSION POWER OF TERMINAL IN WIRELESS ENVIRONMENT

(71) Applicant: SAMSUNG SDS CO., LTD., Seoul (KR)

(72) Inventors: You-Chang Ko, Seoul (KR); Yang-Hwan Joe, Goyang-Si (KR); Ha-Young Kim, Bucheon-Si (KR); Dong-Eun Oh, Yongin-Si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 71 days.

(21) Appl. No.: 14/555,250

(22) Filed: Nov. 26, 2014

(65) Prior Publication Data

US 2015/0156731 A1    Jun. 4, 2015

(30) Foreign Application Priority Data

Nov. 29, 2013   (KR) ........................ 10-2013-0147399

(51) Int. Cl.
*H04W 52/28* (2009.01)
*H04W 52/24* (2009.01)
*H04W 52/14* (2009.01)
*H04W 52/38* (2009.01)

(52) U.S. Cl.
CPC ....... *H04W 52/246* (2013.01); *H04W 52/281* (2013.01); *H04W 52/146* (2013.01); *H04W 52/38* (2013.01)

(58) Field of Classification Search
CPC . H04W 52/246; H04W 52/281; H04W 52/38; H04W 52/146
See application file for complete search history.

(56) References Cited

U.S. PATENT DOCUMENTS

| | | | | |
|---|---|---|---|---|
| 2004/0132478 A1* | 7/2004 | Yu | .......................... | H04W 52/24 455/522 |
| 2006/0073791 A1* | 4/2006 | Senarath | ............. | H04W 52/146 455/67.13 |
| 2006/0099986 A1* | 5/2006 | Vaittinen | ............. | H04W 52/367 455/522 |
| 2006/0183495 A1* | 8/2006 | Soliman | ................ | H04W 52/24 455/522 |
| 2007/0111746 A1* | 5/2007 | Anderson | ........... | H04W 52/223 455/522 |
| 2009/0156259 A1* | 6/2009 | Han | .................... | H04W 52/244 455/561 |
| 2010/0056133 A1* | 3/2010 | Dua | ........................ | H03M 7/30 455/423 |

(Continued)

*Primary Examiner* — Nathan Mitchell
(74) *Attorney, Agent, or Firm* — Sughrue Mion, PLLC

(57) ABSTRACT

Disclosed are an apparatus and method for controlling transmission power of a terminal in a wireless environment. The apparatus for controlling transmission power of a terminal includes an optimal transmission power calculation unit configured to calculate an optimal transmission power value for a terminal of a type, the terminal being accessible to one or more wireless networks; a transmission power setting unit configured to, when an access of the terminal to at least one of the one or more wireless networks is sensed, provide the terminal with optimal transmission power values corresponding to the terminal and the network accessed by the terminal.

26 Claims, 10 Drawing Sheets

(56) References Cited

U.S. PATENT DOCUMENTS

| | | | | |
|---|---|---|---|---|
| 2012/0252453 A1* | 10/2012 | Nagaraja | ............. | H04W 52/243 |
| | | | | 455/436 |
| 2012/0252521 A1* | 10/2012 | Nagaraja | ............. | H04W 52/243 |
| | | | | 455/522 |
| 2014/0080538 A1* | 3/2014 | Damnjanovic | ..... | H04W 52/146 |
| | | | | 455/522 |
| 2014/0323108 A1* | 10/2014 | Doubek | ............. | H04W 52/283 |
| | | | | 455/418 |
| 2015/0018028 A1* | 1/2015 | Uplenchwar | ....... | H04W 52/143 |
| | | | | 455/522 |

\* cited by examiner

APPARATUS AND METHOD FOR CONTROLLING TRANSMISSION POWER OF TERMINAL IN WIRELESS ENVIRONMENT

CROSS-REFERENCE TO RELATED APPLICATION

This application claims priority to and the benefit of Korean Patent Application No. 10-2013-0147399, filed on Nov. 29, 2013, the disclosure of which is incorporated herein by reference in its entirety.

BACKGROUND

1. Field

The present disclosure relates to a technology for controlling transmission power of a terminal in a wireless network.

2. Discussion of Related Art

Upon designing an enterprise wireless network considering a packet voice service (VoIP) and a streaming service, a service range of an access point (AP) tends to be designed to be smaller than that of a public hotspot area. Accordingly, in such an environment, a mobile terminal may perform data communication with a base station even using relatively low transmission power, compared to in a public hotspot area. However, a default data transmission power value (level) of commercially available mobile terminals is fixed to a sufficiently high value. Accordingly, in such a wireless network environment, transmission power control (TPC) for reducing unnecessary power consumption and also minimizing an influence on another wireless communication is essentially required at a terminal side.

However, an existing transmission power control scheme has the following problems. First, since a radio wave environment changes quickly and variously in an indoor environment, it is difficult for a terminal or an access point controller to accurately measure a radio wave environment for transmission power control in real time. Second, in order to control transmission power at a terminal side, additional power consumption occurs due to measurement of a radio wave environment, such as data reception sensitivity, and periodic data communication with an access point controller. The additional power consumption cost often exceeds a power consumption gain by performing real-time transmission power control.

SUMMARY

Embodiments of the present disclosure are directed to providing a means for optimally controlling transmission power of a terminal according to a condition of a wireless network.

Embodiments of the present disclosure are also directed to providing a method of minimizing power consumption at a terminal side during a data transmission process of a terminal.

According to an aspect of the present disclosure, there is provided an apparatus for controlling transmission power of a terminal, the apparatus including: an optimal transmission power calculation unit configured to calculate an optimal transmission power value for a terminal of a type, the terminal being accessible to one or more wireless networks; and a transmission power setting unit configured to, when an access of the terminal to at least one of the one or more wireless networks is sensed, provide the terminal with optimal transmission power values corresponding to the terminal and the wireless network accessed by the terminal.

The optimal transmission power calculation unit may be further configured to calculate an optimal transmission power value for each of one or more access points included in a specific wireless network selected from among the one or more wireless networks, and to calculate an optimal transmission power value of the specific wireless network from the calculated optimal transmission power value for each access point.

The optimal transmission power calculation unit may be further configured to measure a service area of a specific access point selected from among the one or more access points using a forward transmission quality between a test terminal and the specific access point, and to calculate a minimum transmission power value at which the test terminal is configured to enable communication in the service area using a reverse transmission quality between the test terminal and the specific access point.

The optimal transmission power calculation unit may be further configured to measure a plurality of forward transmission qualities while moving the test terminal in a preset plurality of directions from one point on a ground closest to the specific access point, to select a plurality of critical communication points corresponding to the plurality of directions from the measured plurality of forward transmission qualities, and to set the service area of the specific access point based on the selected plurality of critical communication points.

The plurality of critical communication points may include a point farthest from the specific access point while the measured forward transmission quality is such that a preset forward transmission quality service level value is met.

The optimal transmission power calculation unit may be further configured to repeatedly measure the forward transmission quality while moving the test terminal, and to select a critical communication point in a direction through a mathematical operation of the measured forward transmission qualities.

The mathematical operation may include calculating one or more of a minimum value, a maximum value, a median value, an arithmetic mean value, a geometric mean value, and a harmonic mean value of one or more of the measured forward transmission qualities.

The optimal transmission power calculation unit may be further configured to measure a plurality of a reverse transmission qualities for each critical communication point while changing transmission power values of the test terminal at the plurality of critical communication points defining the service area, to calculate a plurality of critical communication transmission power values from the measured reverse transmission quality for each critical communication point, and to calculate a minimum transmission power value at which the test terminal is configured to enable communication in the specific access point through a mathematical operation of the calculated plurality of critical communication transmission power values.

The plurality of critical communication transmission power values may include a transmission power value closest to a preset reverse transmission quality service level value while the measured reverse transmission quality is such that the preset reverse transmission quality service level value is met.

The optimal transmission power calculation unit may be further configured to repeatedly measure the reverse transmission quality according to a transmission power value of the test terminal at one point, and to calculate a critical communication transmission power value of the one point through a mathematical operation of the reverse transmission qualities repeatedly measured at the one point.

The mathematical operation of the reverse transmission qualities of the same point may include calculating one or more of a minimum value, a maximum value, a median value, an arithmetic mean value, a geometric mean value, and a harmonic mean value of one or more of the repeatedly measured reverse transmission qualities.

The calculation of the plurality of critical communication transmission power values may include calculating one or more of a minimum value, a maximum value, a median value, an arithmetic mean value, a geometric mean value, and a harmonic mean value of one or more of the plurality of critical communication transmission power values.

When a maximally increased transmission power value of the test terminal is not such that the preset reverse transmission quality service level value is met, the optimal transmission power calculation unit may be configured to change at least one of a transmission power of the specific access point and a forward transmission quality service level value, and to recalculate a minimum transmission power value at which the test terminal is configured to enable communication in consideration of the change.

The optimal transmission power calculation unit may be further configured to set a maximum value of calculated optimal transmission power values for respective access points as the optimal transmission power value of the specific wireless network.

When there is a multi-band wireless network capable of providing a service over a plurality of frequency bands among the one or more wireless networks, the optimal transmission power calculation unit may be configured to calculate an optimal transmission power value for each type of the terminal and each service frequency band of the multi-band wireless network.

When a specific terminal accesses the multi-band wireless network, the transmission power setting unit may be configured to provide the specific terminal with optimal transmission power values of the multi-band wireless network corresponding to a frequency band currently accessed by the specific terminal or corresponding to all frequency bands supported by the specific terminal.

According to another aspect of the present disclosure, there is provided a method of controlling transmission power of a terminal, the method including, calculating, by an optimal transmission power calculation unit, an optimal transmission power value for a terminal of a type, the terminal being accessible to one or more wireless networks; and when an access of the terminal to at least one of the one or more wireless networks is sensed, providing, by a transmission power setting unit, the terminal with optimal transmission power values corresponding to the terminal and the network accessed by the terminal.

The calculating of the optimal transmission power value may include, calculating an optimal transmission power value for each of one or more access points included in a specific wireless network selected from among the one or more wireless networks; and calculating an optimal transmission power value of the specific wireless network from the calculated optimal transmission power value for each access point.

The calculating of an optimal transmission power value for each of one or more access points may include, measuring a service area of a specific access point selected from among the one or more access points using a forward transmission quality between a test terminal and the specific access point; and calculating a minimum transmission power value at which the test terminal is configured to enable communication in the service area using a reverse transmission quality between the test terminal and the specific access point.

The measuring of a service area of the specific access point may further include measuring a plurality of forward transmission qualities while moving the test terminal in a specific direction from one point on a ground closest to the specific access point and selecting a critical communication point in the specific direction from the measured plurality of forward transmission qualities, wherein the optimal transmission power calculation unit repeatedly performs selecting of the critical communication point with respect to each of a preset plurality of directions and sets, as the service area, based on the selected plurality of critical communication points.

The plurality of critical communication points may include a point farthest from the specific access point while the measured forward transmission quality is such that a preset forward transmission quality service level value is met.

The selecting of the critical communication point may include repeatedly measuring the forward transmission quality while moving the test terminal, and selecting a critical communication point in a direction through a mathematical operation of the measured forward transmission qualities.

The mathematical operation includes may include calculating one or more of a minimum value, a maximum value, a median value, an arithmetic mean value, a geometric mean value, and a harmonic mean value of one or more of the measured forward transmission qualities.

The calculating of a minimum transmission power value at which the test terminal may be configured to enable communication further comprises measuring the reverse transmission quality while changing a transmission power value of the test terminal at a specific point among the plurality of critical communication points defining the service area, and calculating a critical communication transmission power value at the specific point from the measured reverse transmission quality, wherein the optimal transmission power calculation unit performs the calculating of the critical communication transmission power value at one or more points defining the service area and calculates a minimum transmission power value at which the test terminal is configured to enable communication in the access point through a mathematical operation of a plurality of critical transmission power values calculated through the repeated performing thereof.

The critical communication transmission power value may include a transmission power value closest to a preset reverse transmission quality service level value while the measured reverse transmissions quality is such that the preset reverse transmission quality service level value is met.

The calculating of the critical communication transmission power value may include repeatedly measuring the reverse transmission quality according to the transmission power value of the test terminal at one point, thereby producing a plurality of reverse transmission qualities, and calculating a critical communication transmission power value of the point through a mathematical operation of the reverse transmission qualities repeatedly measured at the one point, thereby forming a plurality of communication transmission power values.

The mathematical operation of the reverse transmission qualities of the same point may include calculating one or more of a minimum value, a maximum value, a median value, an arithmetic mean value, a geometric mean value, and a harmonic mean value of one or more of the repeatedly measured reverse transmission qualities.

The calculation of the plurality of critical communication transmission power values may include calculating one or more of a minimum value, a maximum value, a median value, an arithmetic mean value, a geometric mean value, and a harmonic mean value of one or more of the plurality of critical communication transmission power values.

When a maximally increased transmission power value of the test terminal is not such that the preset reverse transmission quality service level value is met, the optimal transmission power calculation unit may change at least one of a transmission power of the specific access point and a forward transmission quality service level value, and recalculate a minimum transmission power value at which the test terminal is configured to enable communication in consideration of the change.

The calculating of an optimal transmission power value of the specific wireless network may include setting a maximum value of calculated optimal transmission power values for respective access points as the optimal transmission power value of the specific wireless network.

When there is a multi-band wireless network capable of providing a service over a plurality of frequency bands among the one or more wireless networks, the optimal transmission power calculation unit may calculate an optimal transmission power value for each type of the terminal and each service frequency band of the multi-band wireless network.

When a specific terminal accesses the multi-band wireless network, the transmission power setting unit may provide the specific terminal with optimal transmission power values of the multi-band wireless network corresponding to a frequency band currently accessed by the specific terminal or corresponding to all frequency bands supported by the specific terminal.

According to a still another aspect of the present disclosure, there is provided a mobile terminal including an authentication control unit configured to perform user authentication on a wireless network intended to be accessed by the mobile terminal; and a transmission power control unit configured to set transmission power of the mobile terminal according to an optimal transmission power value acquired corresponding to the wireless network that is authenticated through the authentication control unit.

The optimal transmission power value may be received in addition to a response, including an authentication result, to an authentication request transmitted by the authentication control unit or received through a message separate from the response to the authentication request.

The mobile terminal may further include a wireless communication unit configured to perform wireless data communication with the wireless network, wherein the transmission power control unit may be configured to acquire and store a default transmission power value set in the wireless communication unit and to set the received optimal transmission power value as a transmission power value of the wireless communication unit.

When a disconnection from the wireless network is sensed, the transmission power control unit may be configured to reset the stored default transmission power value as the transmission power value of the wireless communication unit.

The mobile terminal may further include an application interface layer configured to provide one or more application interfaces for acquiring a currently set transmission power value from the wireless communication unit or setting a new transmission power value in the wireless communication unit.

When a transmission power value for a specific radio frequency band is requested from the transmission power control unit, an application interface of the one or more application interfaces may provide the transmission power value for the specific radio frequency band to the transmission power control unit, and when a transmission power value for a non-specific radio frequency band is requested from the transmission power control unit, an application interface of the one or more application interfaces may provide transmission power values for all radio frequency bands provided by the mobile terminal.

When a request to set a transmission power value for a specific radio frequency band is received from the transmission power control unit, an application interface of the one or more application interfaces may provide the transmission power value for the specific radio frequency band to the wireless communication unit.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, embodiments of the present disclosure will be described in detail with reference to the accompanying drawings. The following detailed description will be provided for better understanding of a method, an apparatus, and/or a system that are disclosed in this specification. However, this is only exemplary, and the present disclosure is not limited thereto.

In describing embodiments of the present disclosure, when a detailed description of known techniques associated with the present disclosure unnecessarily obscures the gist of the present disclosure, the detailed description thereof will be omitted. Also, the terms described below are defined with consideration of the functions in the present disclosure, and thus may vary depending on a user, intention of an operator, or custom. Accordingly, the definition will be made on the basis of the whole specification. The terminology used herein is for the purpose of only describing embodiments of the present disclosure, and should not be restrictive. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
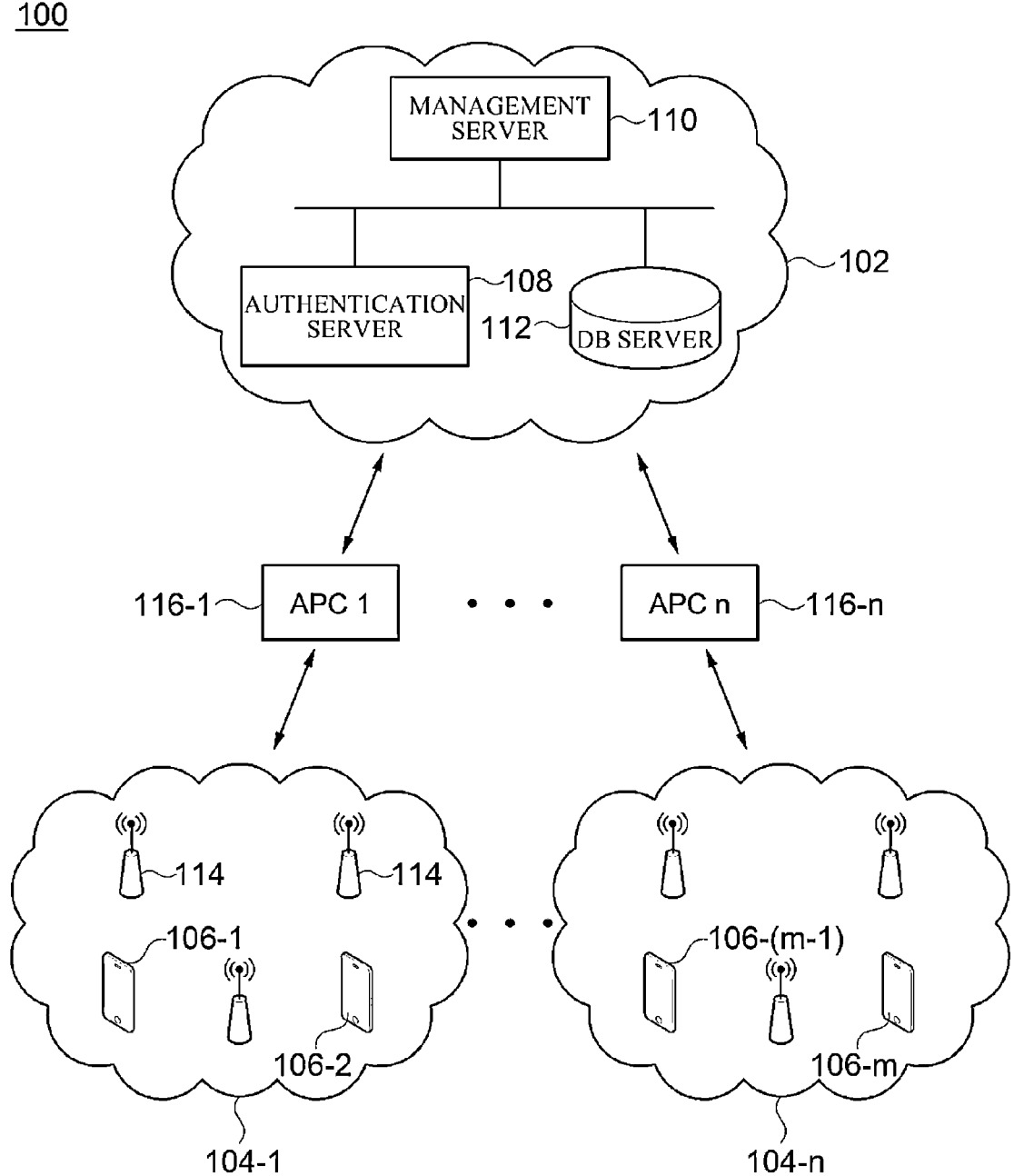
FIG. 1 is a block diagram illustrating a system 100 for controlling transmission power of a terminal in a wireless environment according to an embodiment of the present disclosure.

FIG. 1 is a block diagram illustrating a system 100 for controlling transmission power of a terminal in a wireless environment according to an embodiment of the present disclosure. As shown in FIG. 1, the system 100 for controlling transmission power according to an embodiment of the present disclosure includes a back-end system 102, a plurality of wireless networks 104-1 to 104-n, and a plurality of mobile terminals 106-1 to 106-m, each of which is connected to any one of the plurality of wireless networks 104-1 to 104-n. It is assumed in this embodiment that there are n different wireless networks and m different types of mobile terminals (where n>=1 and m>=1). Furthermore, in the description below, a corresponding reference numeral of the wireless network, such as a wireless network 104-1, is used when the n wireless networks need to be distinctively described and a representative reference numeral, such as a wireless network 104, is used when matters associated with all the wireless networks are described. This is the same with the mobile terminal.

A back-end server group 102 performs authentication and transmission power setting on the m types of mobile terminals 106-1 to 106-m, each of which is connected to any one of the n wireless networks 104-1 to 104-n. The back-end server group 102 may include an authentication server 108, a management server 110, and a database server 112.

The authentication server 108 performs authentication on the terminal 106 that is connected through the wireless network 104. For example, the authentication server 108 may receive an authentication request including an ID and a password from the terminal 106 and authenticate the terminal 106 in response to the received authentication request. In addition, the authentication server 108 may provide the authenticated terminal 104 with an optimal transmission power value of the terminal 104. For example, the terminal 106 may transmit the authentication request including identification information for identifying a type thereof to the authentication server 108. The authentication server 108 may provide the identification information to the management server 110 and acquire the optimal transmission power value of the terminal 104 from the management server 110.

The management server 110 calculates a terminal type-based optimal transmission power value with respect to each of the wireless networks 104 connected to the back-end server group 102 and stores the calculated optimal transmission power value in the database server 112. In addition, upon request from the authentication server 108, the management server 110 provides an optimal transmission power value corresponding to a terminal associated with the request using one of identification information of the terminal, information on a wireless network to which the terminal is currently connected, and frequency band information.

The database server 112 is a server for storing and managing an optimal transmission power value for each wireless network or terminal that is measured by the management server 110.

Next, the wireless network 104 is positioned between the mobile terminal 106 and the back-end server group 102 and configured to provide a communication service to the mobile terminal 106. Each wireless network 104 may include one or more access points 114 and one or more access point controllers 116 that control the one or more access points 114.

Each wireless network 104 is designed in consideration of factors of a service, the number of users, and a physical radio wave environment of an installation place (indoor, outdoor, etc.) Accordingly, although wireless networks are connected to the same back-end server group 102, the wireless networks may have different internal wireless data communication environments.

The mobile terminal 106 (hereinafter, referred to as simply "MT" or "terminal") is a terminal that accesses any one of the above-described n wireless networks 104 and receives a communication service. As described above, in an embodiment of the present disclosure, there are m different types of terminals 106. For example, the types of the terminals may be distinguished according to a terminal manufacturer and a model. In addition, although terminals of the same model are manufactured by the same terminal manufacturer, the terminals may be distinguished as different terminals when internally used mobile chipsets or their associated software applications are different. The mobile terminal 106 may include a wireless network access agent application program for authenticating a terminal through communication with the back-end server group 102 and setting a received optimal transmission power value to the terminal. In addition, this application program may control the transmission power value of the mobile chipset through an application programming interface (API) that is provided in an operating system (OS) layer (platform) of the mobile terminal 106.

The m types of terminals 106 that are connected to the wireless networks 104 have respective default transmission power values that are set when the terminals are released from the factory. Hereinafter, a product model of an i-th terminal of the m types of mobile terminals 106 is represented as MT_i (1≤i≤m), and a default transmission power value of MT_i is represented as MT_i_DFT_TP. Although a terminal is released by the same manufacturer, MT_i_DFT_TP has a different value according to a product model or a wireless modem chipset fabrication model equipped in the terminal.

The back-end server group 102 measures an optimal transmission power value of MT_i that will receive a data service in a wireless frequency band b (1<b<e, where e is the number of wireless frequency bands that may be serviced in the wireless network) of each wireless network 104 in consideration of a cell radius and an internal radio wave environment of the access point 114 that is established for each wireless network 104. A detailed method of finding the optimal transmission power value for each wireless network 104 will be described below. Hereinafter, an optimal transmission power of an i-th terminal 106-i (MT_i) in a wireless frequency band b for a k-th wireless network 104-k (1≤k≤n) may be represented as MT_i_WN_k_OTP_TP_b. That is, in an embodiment of the present disclosure, the back-end server group 102 measures and manages an optimal transmission power value for each wireless network, wireless frequency band, and a terminal type. The measurement of the optimal transmission power value may be repeatedly performed whenever a certain time period has elapsed or whenever an environment of a wireless network changes (change in an indoor layout, addition and removal of an access point to and from the wireless network, and installation/removal of an external wireless network).

Subsequently, when the terminal 106 accesses any one of the plurality of wireless networks 104, the back-end server group 102 may provide the terminal 106 with a wireless network to be accessed by the terminal 106, a wireless frequency band, and an optimal transmission power value corresponding to a terminal type, thus allowing the terminal 106 to set the wireless network, the wireless frequency band, the optimal transmission power value.

Specifically, MT_i having the transmission power value initially set as MT_i_DFT_TP approaches the wireless network 104-1 to request authentication by a wireless network access agent, information on MT_i that is an authentication parameter is transmitted to the authentication server 108 via the access point AP 114 and the access point controller 116. The authentication server 108 included in the back-end server group 102 finds identification information of MT_i and identification information of a wireless network included in the authentication request. The identification information may be, for example, manufacturer/model information of MT_i that requests an access to the wireless network 1 WN_1.

If authentication of MT_i succeeds in the authentication server 108, the authentication server 108 receives an optimal transmission power value MT_i_WN_1_OTP_TP_b corresponding to MT_i of the wireless network 1 from the management server 110 and transmits the optimal transmission power value to MT_i. Then, a wireless network access agent installed in MT_i stores MT_i_DFT_TP as a default transmission power value thereof and sets MT_i_WN_1_OPT_TP_b as a new transmission power value thereof to perform data communication in the wireless network 104-1. In this case, wireless frequency access band information b may be determined by the authentication server 108 using an authentication policy according to information on MT_i.

Subsequently, when MT_i recedes from the wireless network 104-1, MT_i resets a transmission power value thereof as MT_i_DFT_TP that is a default value. When MT_i accesses a wireless network 104-2, MT_i sets MT_i_WN_2_OPT_TP_b as a new transmission power value thereof in the same method as described above.

Figure 2:
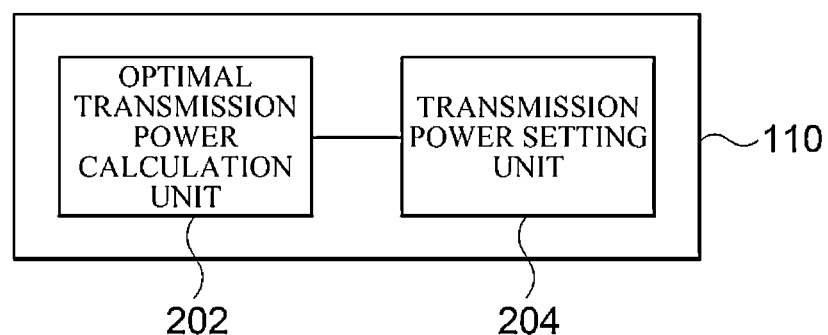
FIG. 2 is a block diagram illustrating a detailed configuration of a management server 110 according to an embodiment of the present disclosure.

FIG. 2 is a block diagram illustrating a detailed configuration of a management server 110 according to an embodiment of the present disclosure. The management server 110 according to an embodiment of the present disclosure is a server for controlling transmission power of a terminal that has accessed the wireless network and, as described above, includes an optimal transmission power calculation unit 202 and a transmission power setting unit 204.

The optimal transmission power calculation unit 202 calculates a type-based optimal transmission power value of a terminal 106 that is accessible to a wireless network 104 connected with the back-end server group 102. Specifically, the optimal transmission power calculation unit 202 calculates an optimal transmission power value for each of the one or more access points included in each wireless network 104 and calculates an optimal transmission power value of each wireless network 104 from the calculated optimal transmission power value for each access point.

Furthermore, in order to calculate the optimal transmission power value for each access point 114, first, the optimal transmission power calculation unit 202 measures a service area of the access point 114 using a forward transmission quality TX_QoS between the access point 114 and the terminal 106 and calculates a minimum transmission power value at which the test terminal enables communication in the service area using a reverse transmission quality RX_QoS between the terminal 106 and the access point 114.

When an access of the terminal 106 to any one of connected wireless networks 104 is sensed, the transmission power setting unit 204 provides the accessed terminal 106 with optimal transmission power values corresponding to the accessing terminal 106 and the wireless network accessed by the terminal 106 or corresponding to all frequency bands supported by the terminal.

Figure 3:
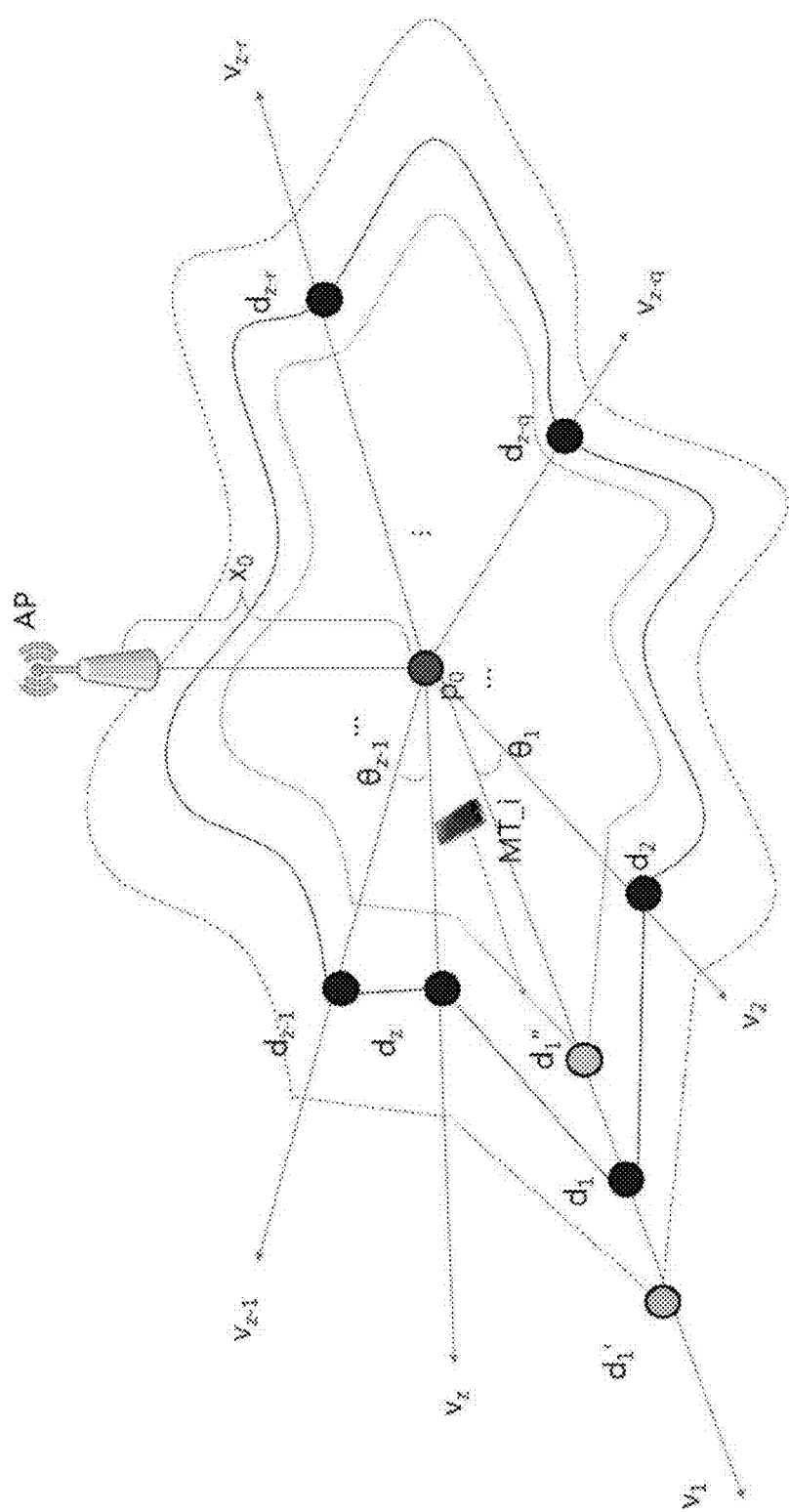
FIG. 3 is an exemplary diagram illustrating a process of an optimal transmission power calculation unit 202 finding a service area s of any access point in a wireless network 104 and an optimal transmission power value of a terminal MT_i in the service area according to an embodiment of the present disclosure.

FIG. 3 is an exemplary diagram illustrating a process of the optimal transmission power calculation unit 202 finding a service area s of any access point in the wireless network 104 and an optimal transmission power value of a terminal MT_i in the service area. In this case, MT_i serves as a test terminal for finding an optimal transmission power value in a corresponding network 104. As described above, when there are m types of terminals that are accessible to the wireless network 104, the optimal transmission power calculation unit 202 repeats a process of finding an optimal transmission power value of each terminal using the m test terminals.

As shown in FIG. 3, a distance between a point $p_0$ where a virtual line drawn vertically from any access point AP to the ground intersects with the ground and the AP is defined as a shortest distance $X_0$ between MT_i and the access point AP. In this case, the access point AP may be installed on a ceiling, a wall, a pillar, and the like inside a building according to characteristics of an area where the wireless network 104 is installed.

The optimal transmission power calculation unit 202 measures a forward transmission quality TX_QoS (quality of data transmitted from AP to MT_i; measured by MT_i and then transmitted to AP) and a backward transmission quality RX_QoS (quality of data transmitted from MT_i to AP; measured by AP) while moving MT_i in a direction of any vector $v_1$ that is perpendicular to a straight line (AP to $p_0$) at the point $p_0$. In this case, TX_QoS and RX_QoS are all data quality parameters that can be measured by MT_i, and may include one or more of a bit error rate (BER), a packet error rate (PER), a signal-to-noise-plus-interference ratio (SNIR), and a received signal strength indicator (RSSI). Parameters constituting the above described TX_QoS and RX_QoS decrease (SNIR, RSSI, etc.) or increase (BER, PER, etc.) as the terminal becomes farther away from the access point 114. When the parameters increase above or decrease below a specific reference value, forward communication or reverse communication is physically impossible. As such, thresholds of TX_QoS and RX_QoS, which enable the forward communication or reverse communication, are defined as a forward transmission quality threshold TX_QoS_THOLD and a reverse transmission quality threshold RX_QoS_THOLD. That is, if a measured TX_QoS or RX_QoS is within TX_QoS_THOLD or RX_QoS_THOLD, the forward communication or reverse communication becomes possible, and otherwise, the forward communication or reverse communication becomes impossible. As described above, the parameters may be divided into two types: some increase and the others decrease according to a distance from the access point 114. An expression "within the threshold" has various meanings depending on which type is used as an index of TX_QoS and RX_QoS. For example, when BER is used as the index of TX_QoS and RX_QoS, "BER being within a threshold" or "BER satisfying a threshold" means that measured BER is lower or smaller than threshold BER. On the contrary, when SNIR is used as the index of TX_QoS and RX_QoS, "SNIR being within a threshold" or "SNIR satisfying a threshold" means that measured SNIR is higher or larger than threshold SNIR. This is the same with TX_QoS_SLA and RX_QoS_SLA to be described below.

The optimal transmission power calculation unit 202 may set a service level agreement (SLA) to be higher (SNIR, RSSI, etc.) or lower (BER, PER, etc.) than a threshold according to an attribute of a data service that is intended to be serviced in a corresponding wireless network. The service level agreement (SLA) is defined as a forward transmission quality service level value TX_QoS_SLA and a reverse transmission quality service level value RX_QoS_SLA. That is, the optimal transmission power calculation unit 202 may define $\Delta q$ ($>=0$) in order to set TX_QoS_SLA and RX_QoS_SLA as more conservative values than the thresholds TX_QoS_THOLD and RX_QoS_THOLD. In this case, relations among TX_QoS_SLA, RX_QoS_SLA, TX_QoS_THOLD, and RX_QoS_THOLD are as follows.

<Parameters Increase the Farther Away from AP>

$TX\_QoS\_SLA = TX\_QoS\_THOLD + \Delta q$ $RX\_QoS\_SLA = RX\_QoS\_THOLD + \Delta q$ <Parameters Decrease the Farther Away from AP>

Figure 4:
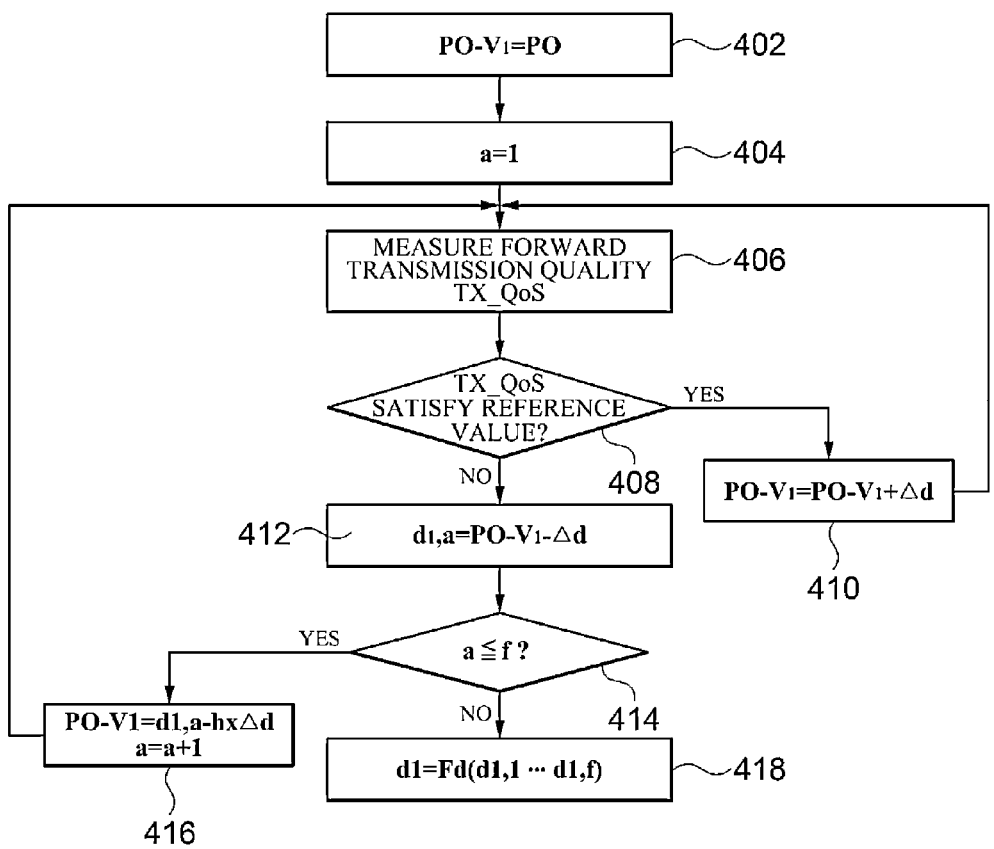
FIG. 4 is a flowchart for describing a process 400 of the optimal transmission power calculation unit 202 calculating a service area according to an embodiment of the present disclosure.

$TX\_QoS\_SLA = TX\_QoS\_THOLD - \Delta q$ $RX\_QoS\_SLA = RX\_QoS\_THOLD - \Delta q$ FIG. 4 is a flowchart for describing a process 400 of the optimal transmission power calculation unit 202 calculating a service area according to an embodiment of the present disclosure. In the illustrated flowchart, it is assumed that MT_i measures a forward transmission quality while moving in a direction from $p_0$ along $v_1$.

In operation 402, the optimal transmission power calculation unit 202 sets a position of MT_i as a position $p_0$.

In operation 404, the optimal transmission power calculation unit 202 sets a counter (a) as 1. The counter (a) is used to perform measurement at a critical communication point repeatedly multiple times in a corresponding direction. That is, since a deviation may occur due to changes in surrounding wireless environment even when forward transmission quality is measured while MT_i moves in the same direction from $p_0$, the optimal transmission power calculation unit 202 according to an embodiment of the present disclosure repeatedly measures the forward transmission quality while repeatedly moving MT_i.

In operations 406 to 412, the optimal transmission power calculation unit 202 measures TX_QoS at every position (P0_$v_1$) moving MT_i by $\Delta d$ in a direction from the point $p_0$ along the vector $v_1$ (406) and determines whether the measured TX_QoS is within the TX_QoS_SLA that is a reference value (408). When the determination result of operation 408 is that the measured TX_QoS is within the TX_QoS_SLA being a reference value, the optimal transmission power calculation unit 202 further moves MT_i by $\Delta d$ in a direction of the vector $v_1$ (410), and then repeats operations 406 and 408. However, on the contrary, if the determination result of operation 408 is that the measured TX_QoS is outside the TX_QoS_SLA that is a reference value, the optimal transmission power calculation unit 202 sets a position moved from a current position of MT_i by $\Delta d$ in a direction of $p_0$ as a critical communication point $d_{1,a}$ in a direction of $v_1$ (412).

When the critical communication point is set, the optimal transmission power calculation unit 202 moves MT_i by a certain distance (for example, h times of $\Delta d$ ($h>=1$)) in a direction of $p_0$ (back-off) and then repeats operations 406 to 412 $f$ ($>=1$) times (414, 416). In this case, h and f may be determined appropriately in consideration of characteristics of an AP and a terminal.

As such, when f critical communication points $d_{1,1}$ to $d_{1,f}$ are calculated in a direction of $v_1$, in operation 418, the optimal transmission power calculation unit 202 calculates a critical communication point $d_1$ in a direction of $v_1$ using the f critical communication points (418), as follows.

$$d_1 = F_d(d_{1,1}, \ldots, d_{1,f})$$

where $F_d$ is a symbol that denotes a mathematical operation for calculating $d_1$ from the f critical communication points, and includes one or more of a minimum value, a maximum value, a median value, an arithmetic mean value, a geometric mean value, and a harmonic mean value calculated from input values $d_{1,1}, \ldots, d_{1,f}$.

The optimal transmission power calculation unit 202 repeats the above-described process 400 with respect to preset z vectors $v_1$ to $v_z$ to calculate critical communication points $d_1$ to $d_z$ for the respective vectors. In this case, the number z of vectors may be set appropriately in consideration of a physical environment of a position in which an AP is installed. Subsequently, a closed curve is formed by connecting the critical communication points $d_1$ to $d_z$, thus finding a service area of a corresponding access point (an area outlined in a thick solid line).

Figure 5:
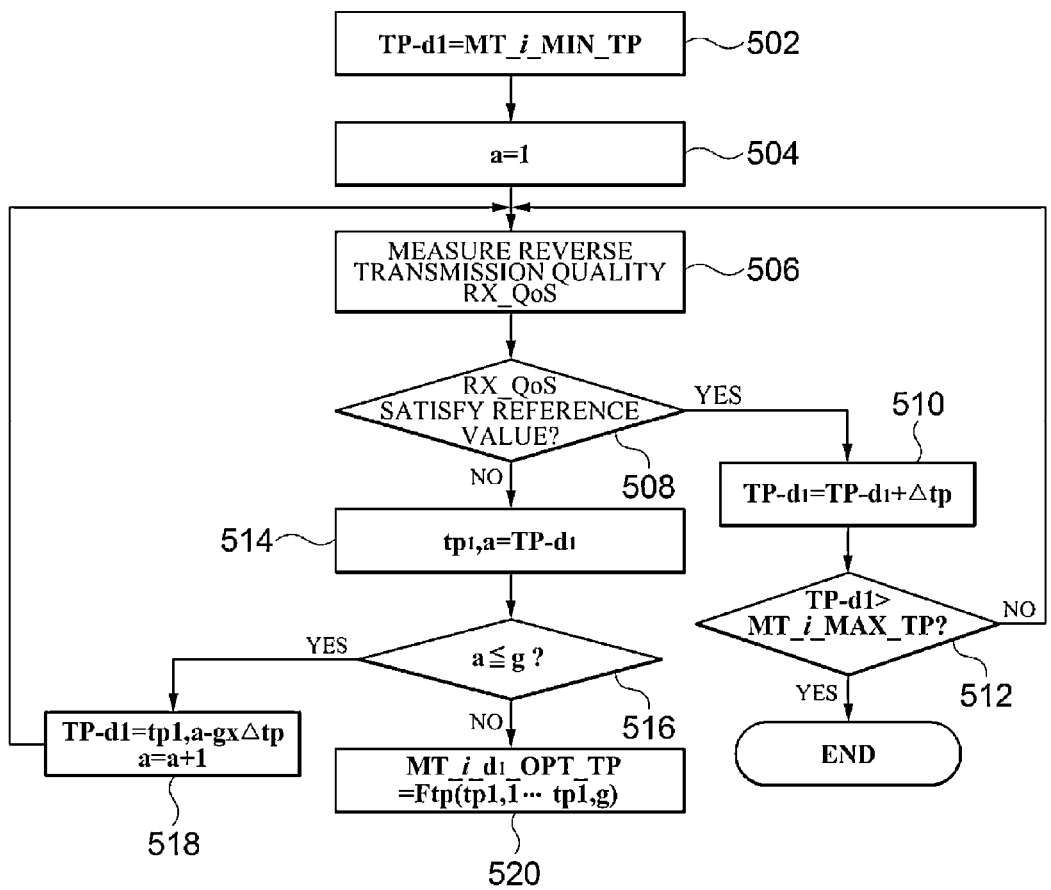
FIG. 5 is a flowchart for describing a process 500 of the optimal transmission power calculation unit 202 calculating an optimal transmission power value of a terminal for each access point according to an embodiment of the present disclosure.

FIG. 5 is a flowchart for describing a process 500 of the optimal transmission power calculation unit 202 calculating an optimal transmission power value of a terminal for each access point. In this flowchart, it is assumed that the optimal transmission power value of MT_i is calculated at the above-found critical communication point $d_1$.

In operation 502, the optimal transmission power calculation unit 202 sets transmission power TP_$d_1$ of a wireless network access agent installed in MT_i at the point $d_1$ as a minimum transmission power value MT_i_MIN_TP that is supported by a mobile chipset of MT_i.

In operation 504, the optimal transmission power calculation unit 202 sets a counter (a) as 1. The counter (a) is used to measure a minimum transmission power value at the same point repeatedly multiple times, like in FIG. 4.

In operations 506 and 508, the optimal transmission power calculation unit 202 measures RX_QoS between MT_i and AP with respect to set transmission power (506) and compares the measured RX_QoS with the set RX_QoS_SLA (508).

If the determination result of operation 508 is that the measured RX_QoS does not satisfy the RX_QoS_SLA that is a reference value, the optimal transmission power calculation unit 202 additionally increases the current transmission power TP_$d_1$ of MT_i by Δtp (510) and determines whether the increased transmission power exceeds a maximum transmission power value MT_i_MAX_TP that is supported by the mobile chipset of MT_i (512). If the determination result of operation 512 is that the increased transmission power exceeds MT_i_MAX_TP, RX_QoS still does not satisfy the RX_QoS_SLA although the transmission power of MT_i is increased maximally. Accordingly, the optimal transmission power calculation unit 202 completes the process, changes at least one of transmission powers of AP and TX_QoS_SLA, and then performs the optimal transmission power calculation process again, according to the changed parameter. However, on the other hand, when the result of operation 512 is that the increased transmission power does not exceed MT_i_MAX_TP, the optimal transmission power calculation unit 202 performs operations 506 and 508 again using the increased transmission power.

When the determination result of operation 508 is that the measured RX_QoS is within a reference value, the optimal transmission power calculation unit 202 sets transmission power at that time as a critical communication transmission power value $tp_{1,a}$ of MT_i at $d_1$ (514).

When the critical communication transmission power value is calculated, the optimal transmission power calculation unit 202 decreases the transmission power of the terminal MT_i by a certain level (for example, q times of Δtp (q>=1)) and then repeats operations 506 to 512 $g$ (>=1) times (516, 518). In this case, q and g may be set appropriately in consideration of characteristics of an AP and a terminal. That is, the critical communication transmission power value $tp_{1,a}$ at $d_1$ is repeatedly measured a preset number g (g>=1) times, and the optimal transmission power calculation unit 202 finally determines the critical communication transmission power value MT_i_$d_1$_OPT_TP at $d_1$ through a mathematic operation of the repeatedly measured values (520). In this case, the mathematical operation Ftp may be one of a minimum value, a maximum value, a median value, an arithmetic mean value, a geometric mean value, and a harmonic mean value of the measured g critical transmission power values $tp_{1,1}$ to $tp_{1,g}$.

The optimal transmission power calculation unit 202 repeatedly performs process 500 at z critical communication points $d_1$ to $d_z$ that are calculated by performing process 400 to calculate z critical communication transmission power values MT_i_$d_1$_OPT_TP to MT_i_$d_z$_OPT_TP, and calculates an optimal transmission power value MT_i_CELL_s_OPT_TP of MT_i with respect to a service area CELL_s of any AP through a mathematic operation of the calculated critical transmission power values, as follows:

$$MT\_i\_CELL\_s\_OPT\_TP = F_{tp}(MT\_i\_d_1\_OPT\_TP, \ldots, MT\_i\_d_z\_OPT\_TP).$$

In this case, the mathematical operation $F_{tp}$ may be one of a minimum value, a maximum value, a median value, an arithmetic mean value, a geometric mean value, and a harmonic mean value of z critical transmission power values MT_i_$d_1$_OPT_TP to MT_i_$d_z$_OPT_TP.

Radio wave characteristics may vary depending on a wireless frequency band (a 2 GHz band, a 5 GHz band, and so on) being serviced despite the same AP. Accordingly, when the AP and the terminal MT_i support multiple wireless frequency bands, the optimal transmission power calculation unit 202 calculates an optimal transmission power value of a terminal for each service frequency band by repeatedly performing processes 400 and 500 on each of the plurality of service wireless frequency bands.

Figure 6:
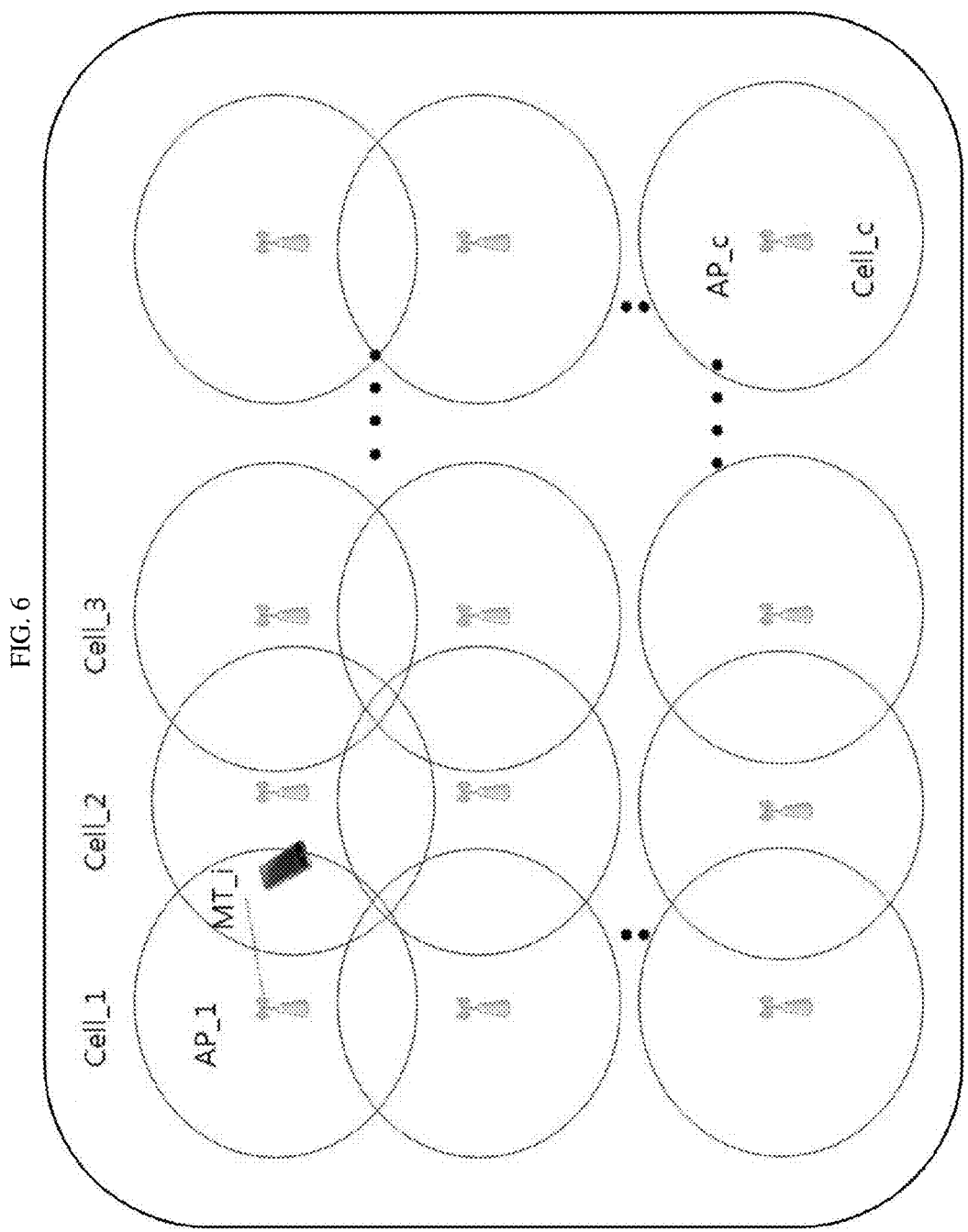
FIG. 6 is a view for describing a process of calculating an optimal transmission power value of each wireless network for the optimal transmission power value of each access point that is calculated by the optimal transmission power calculation unit 202 according to an embodiment of the present disclosure.

FIG. 6 is a view for describing a process of calculating an optimal transmission power value of each wireless network for the optimal transmission power value of each access point that is calculated by the optimal transmission power calculation unit 202 according to an embodiment of the present disclosure.

As shown in FIG. 6, a wireless network k(104-$k$) includes c cells. Accordingly, when optimal transmission power values of m types of terminals are calculated with respect to b wireless frequency bands that can be serviced for each cell, m*c*b reverse optimal transmission power values may be found from any wireless network area including c cells.

In addition, since communication should be done using a single transmission power value in all cells included in a wireless network over any wireless frequency band e (1<e<b) that can be serviced in the wireless network k(104-$k$), the optimal transmission power calculation unit 202 finally set a maximum value among c optimal transmission power values corresponding to the wireless frequency band as an optimal transmission power value of the wireless frequency band. In this way, when m*b optimal transmission power values are determined for respective terminals and wireless frequency bands and then repeated in n wireless networks, finally, n*m*b optimal transmission power values are stored in the database server 112.

Figure 7:
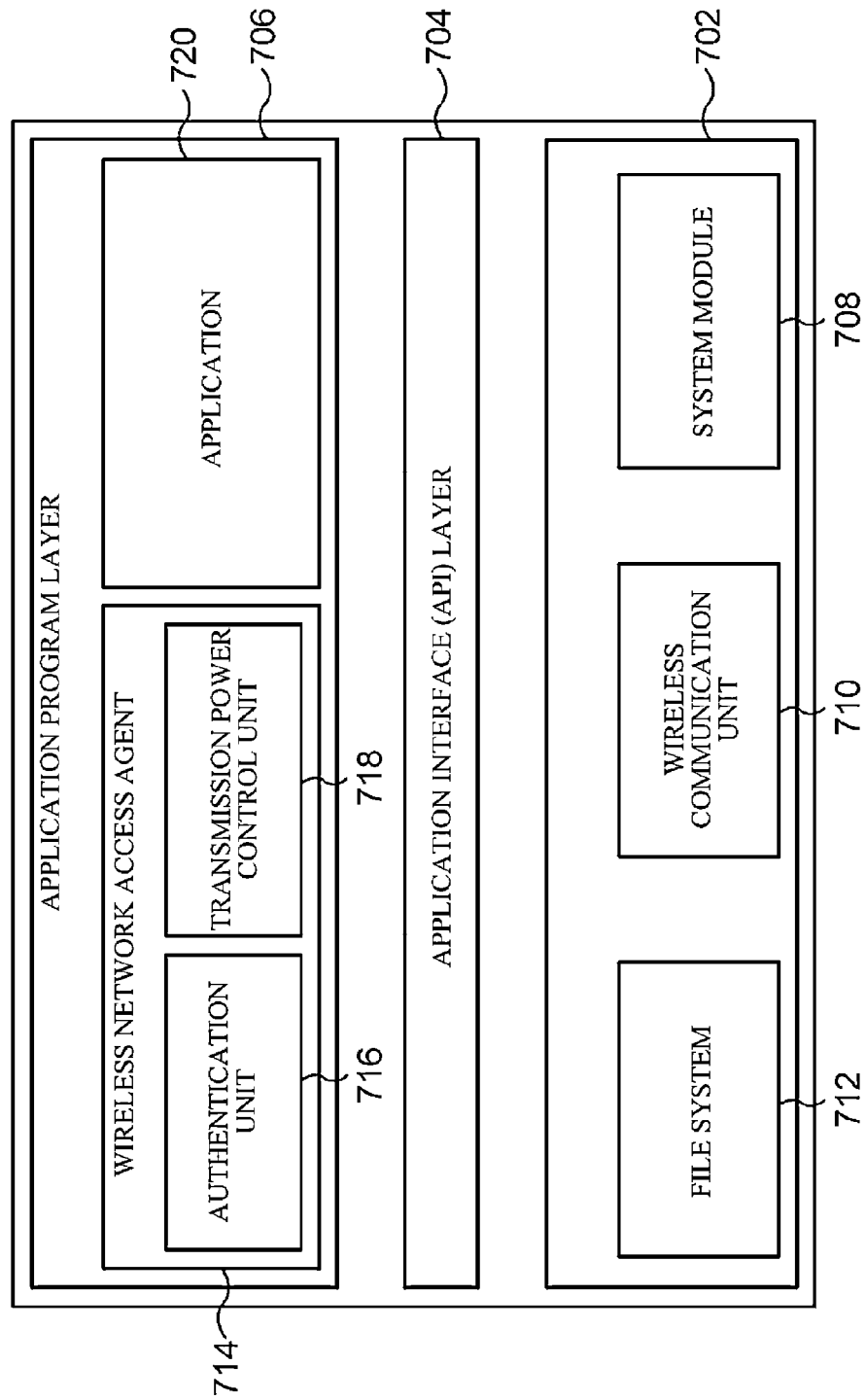
FIG. 7 is a block diagram illustrating a detailed configuration of a mobile terminal 106 according to an embodiment of the present disclosure.

FIG. 7 is a block diagram illustrating a detailed configuration of a mobile terminal 106 according to an embodiment of the present disclosure. As shown in FIG. 7, the mobile terminal 106 according to an embodiment of the present disclosure includes a system layer 702, an application program layer 706, and an application interface layer 704 that enables the system layer 702 and the application program layer 706 to interact with each other.

The system layer 702 has functional blocks, such as a wireless communication unit 710, a file system 712, and the like, that cannot be directly accessed by a user. The application program layer 706 has application programs, such as a wireless network access agent 714, that may directly interface with the user. The application interface layer 704 has a set of application programming interfaces (APIs) through which the application programs in the application program layer 706 may control the functional blocks of the system layer 702.

A system module 708 of the system layer 702 is a module for controlling overall functions associated with the driving of the mobile terminal 106.

The wireless communication unit 710 performs data communication with an access point 114 adjacent to the mobile terminal 106. The wireless communication unit 710 may include hardware and software elements, such as an antenna, a communication chipset, and a driving driver, for wireless data communication with the access point 114.

The file system 712 is a storage space for reading or writing data needed while application programs such as the wireless network access agent 714 are driven.

The wireless network access agent 714 is one application program installed in the mobile terminal 106 and includes an authentication control unit 716 and a transmission power control unit 718. In the application program layer 706, a separate application program 720 may be executed according to a function of the mobile terminal 106 in addition to the wireless network access agent 714.

When the mobile terminal 106 first accesses the wireless network, the authentication control unit 716 transmits and receives an authentication request and an authentication result through the wireless communication unit 710. In addition, the authentication control unit 716 sets various types of parameters and provides an interface for wireless network communication using authentication information of the mobile terminal 106 and wireless network access authentication information input from a user.

The transmission power control unit 718 acquires an optimal transmission power value received separately from or together with the authentication response. The number of optimal transmission power values downloaded from the management server 110 may be one or more according to information on a radio frequency band RF_Band provided by the mobile terminal 106. When the optimal transmission power value is acquired, the transmission power control unit 718 performs the following.

1) A default transmission power value MT_i_DFT_TP that is currently applied to the mobile terminal 106 is obtained from the wireless communication unit 710. In this case, acquisition of the default transmission power value MT_i_DFT_TP from the wireless communication unit 710 may be made through the application interface layer 704 and may use the following function call including an API:

Get_Tx_Power(RF_B and).

That is, when the transmission power control unit 718 calls a function Get_Tx_Power using a parameter such as the radio frequency band RF_Band, the wireless communication unit 710 returns only a transmission power value set in a corresponding radio frequency band as a return value of the function. Alternatively, when the transmission power control unit 718 calls the function Get_Tx_Power without a parameter for radio frequency band RF_Band information, the wireless communication unit 710 may return the transmission power values for the overall radio frequency band RF_Band, which are provided by a communication chipset. If the acquisition of the transmission power value fails, the function Get_Tx_Power returns fail information. If the acquisition succeeds, the transmission power value may be a number that is represented in decimal or hexadecimal form.

2) The transmission power control unit 718 stores the acquired default transmission power value MT_i_DFT_TP in the file system 712.

3) The transmission power control unit 718 sets a downloaded optimal transmission power value to the wireless communication unit 710. In this case, setting of optimal transmission power value to the wireless communication unit 710 may be made through the application interface layer 704 and may use the following function call including an API:

Set_Tx_Power(RF_Band, Value).

That is, a radio frequency band RF_Band and a value intended to be set in the band, that is, an optimal transmission power value are delivered as parameters. As a result, the function Set_Tx_Power may return setting success and setting failure information.

4) When the mobile terminal 106 gets out of the wireless network, the transmission power control unit 718 senses that the mobile terminal 106 recedes from the wireless network, reads a default transmission power value MT_i_DFT_TP stored through the file system 712, and sets the transmission power value to an original state using the above-described function Set_Tx_Power.

A process of the mobile terminal 106 with the above described configuration accessing the wireless network 104 and setting an optimal transmission power appropriate for the accessed wireless network 104 will be described in divided embodiments. Embodiment 1 shows an example in which a terminal i(106-$i$) approaches a wireless network k(104-$k$) and requests authentication. Embodiment 2 shows an example in which the terminal i(106-$i$) recedes and disconnects from the wireless network k(104-$k$). Embodiment 3 shows an example in which the terminal i(106-$i$) approaches another wireless network 1 (106-1, 1≠k).

Embodiment 1

When the terminal i(106-$i$) approaches the wireless network k(104-$k$), a wireless communication unit 710 of the terminal i(106-$i$) recognizes the wireless network k(104-$k$) from a broadcasting packet or the like that is received from the wireless network k(104-$k$). Then, the authentication control unit 716 transmits an authentication request to an authentication server 108 of a back-end server group 102 using user authentication information and terminal information that are set by a user.

The authentication server 108 performs user authentication according to the authentication request and acquires the optimal transmission power value of the terminal i(106-$i$) with respect to the wireless network k(104-$k$) from the management server 110 when the authentication succeeds. Specifically, the authentication server 108 provides information on the wireless network k(104-$k$) accessed by the terminal i(106-$i$), information e on an accessed frequency band, and identification information (a manufacture, a model number, and the like) of the terminal i(106-$i$). The management server 110 provides an optimal transmission power value MT_i_WN_k_OTP_TP_e of the terminal i corresponding to the received information to the authentication server 108. Then, the authentication server 108 transmits the acquired optimal transmission power value to the terminal i(106-$i$) together with an authentication response or through a message separate from the authentication response.

However, on the other hand, when the authentication of the terminal i(106-$i$) fails in the authentication server 108, the authentication server 108 does not inquire of the management server 110 about the optimal transmission power value and transmits only an authentication failure response.

Upon receiving the authentication response, the wireless network access agent 714 may inform authentication success to a user through a popup message. However, depending on embodiments, the wireless network access agent 714 may proceed with a next process without a separate popup message. In addition, the transmission power control unit 718 acquires a default transmission power value MT_i_DFT_TP through the wireless communication unit 710 and stores the acquired default transmission power value MT_i_DFT_TP in the file system 712. The transmission power control unit 718 sets, in the wireless communication unit 710, the optimal transmission power value received together with the authentication response or through a message separate from the authentication response to allow data to be transmitted at that power value.

Embodiment 2

When the terminal i(106-*i*) recedes from the wireless network to which the terminal is connected, a transmission power control unit 718 of the wireless network access agent 714 senses the disconnection from the wireless network k(104-*k*) and operates a timer time_recovery. If the terminal i(106-*i*) does not access the wireless network k(104-*k*) by the time the timer expires, the transmission power control unit 718 considers the terminal i(106-*i*) to have completely receded from the wireless network k(104-*k*) and reads a default transmission power value MT_i_DFT_TP from the file system 712 to deliver the default transmission power value MT_i_DFT_TP to the wireless communication unit 710. In this case, a setting time of the timer may be set appropriately according to characteristics of a terminal and a network and operating policies.

The wireless communication unit 710 sets the default transmission power value received through the transmission power control unit 718 to allow data to be transmitted at the power value.

Embodiment 3

When the terminal i(106-*i*) enters the wireless network 1(104-1), the terminal i(106-*i*) performs authentication using the same method as in embodiment 1.

Figure 8:
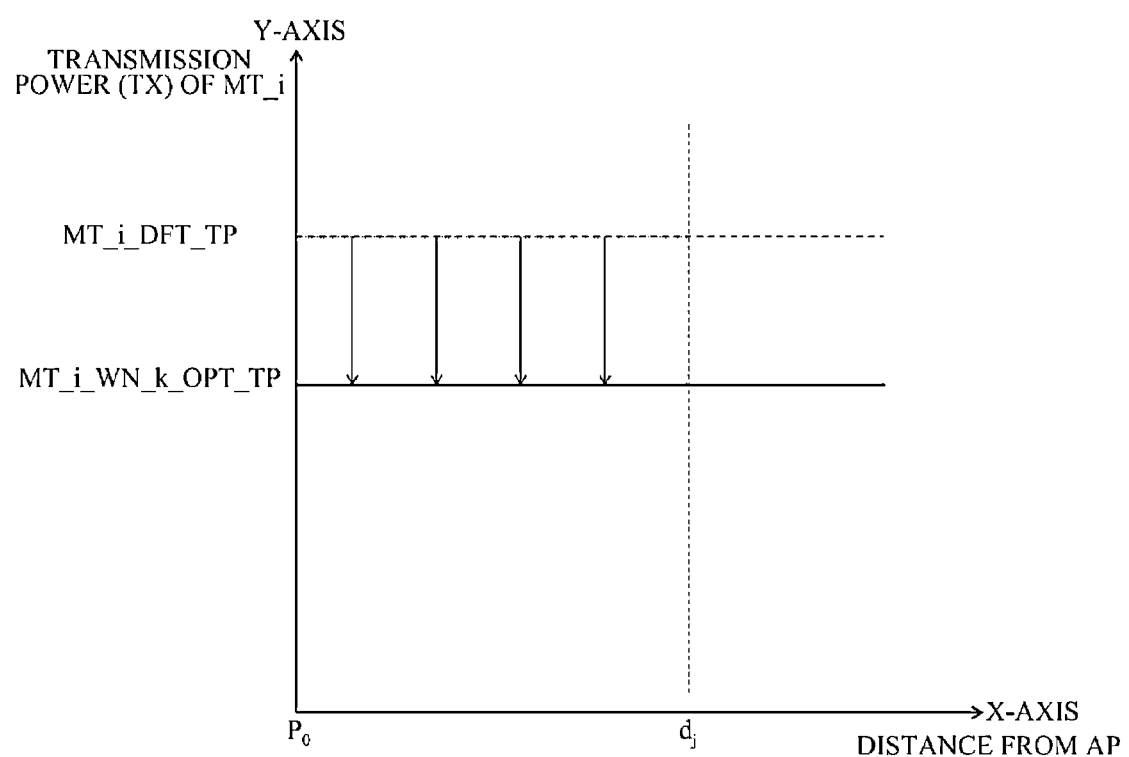
FIG. 8 is a graph for comparing a transmission power consumption amount according to a distance from an access point 114 to a terminal to which the transmission power control method according to embodiments of the present disclosure has been applied and a terminal to which the method has not been applied.
Figure 9:
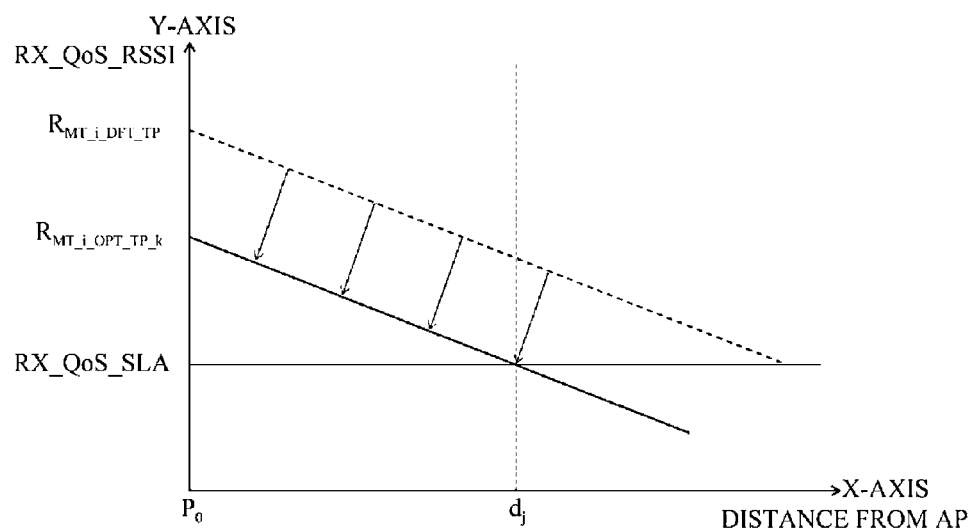
FIG. 9 is a graph showing changes in RSSI RX_QoS_RSSI according to a distance from the access point 114 to a terminal to which the transmission power control method according to embodiments of the present disclosure has been applied and a terminal to which the method has not been applied.

FIGS. 8 and 9 are views for describing an effect according to embodiments of the present disclosure. First, FIG. 8 is a graph for comparing a transmission power consumption amount according a distance from the access point 114 to a terminal to which the transmission power control method according to embodiments of the present disclosure has been applied and a terminal to which the method has not been applied.

Change in transmission power according to a distance of the terminal to which the method has not been applied is shown as a dotted line in FIG. 8. This may be expressed as the following equation: y=MT_i_DFT_TP (where MT_i_DEF_TP is a default power value of the terminal).

Next, change in transmission power according to a distance of the terminal to which the transmission power control method according to embodiments of the present disclosure has been applied is shown as a solid line of FIG. 8. As shown in FIG. 8, according to embodiments of the present disclosure, the terminal 106 receives, from a currently accessed network, an optimal transmission power value MT_i_WN_k_OTP_TP that may be used in the network and sets the optimal transmission power value as transmission power thereof. As described above, since this value is generally lower than the default transmission power value of the terminal, according to the present disclosure, power consumption can be reduced by a difference between the default transmission power value and the received optimal transmission power value.

FIG. 9 is a graph showing changes in RSSI RX_QoS_RSSI according to a distance from the access point 114 to a terminal to which the transmission power control method according to embodiments of the present disclosure has been applied and a terminal to which the method has not been applied. In FIG. 9, RX_QoS_RSSI of the terminal to which the transmission power control method according to embodiments of the present disclosure has been applied is shown as a solid line, and RX_QoS_RSSI of the terminal to which the method has not been applied is shown in a dotted line.

As shown in FIG. 9, since an optimal transmission power value of a terminal is set in consideration of RX_QoS of the terminal according to embodiments of the present disclosure, it can be seen that RSSI in the network is maintained below a reverse transmission quality service level value RX_QoS_SLA.

As described above, in an embodiment of the present disclosure, a transmission power value that is used by the terminal i(106-*i*) may use an optimal transmission power value MT_i_WN_k_OTP_TP that is lower than the default transmission power value MT_i_DEF_TP, thus minimizing interference in the same channel that is being used in neighbor cells. This increases the probability that the same channel that is operating in the neighbor cells will be sensed to be in an idle state, thus increasing the probability that the wireless terminals in the area can perform data communication at the same time, resulting in increasing of the service capacity of the entire wireless network.

Figure 10:
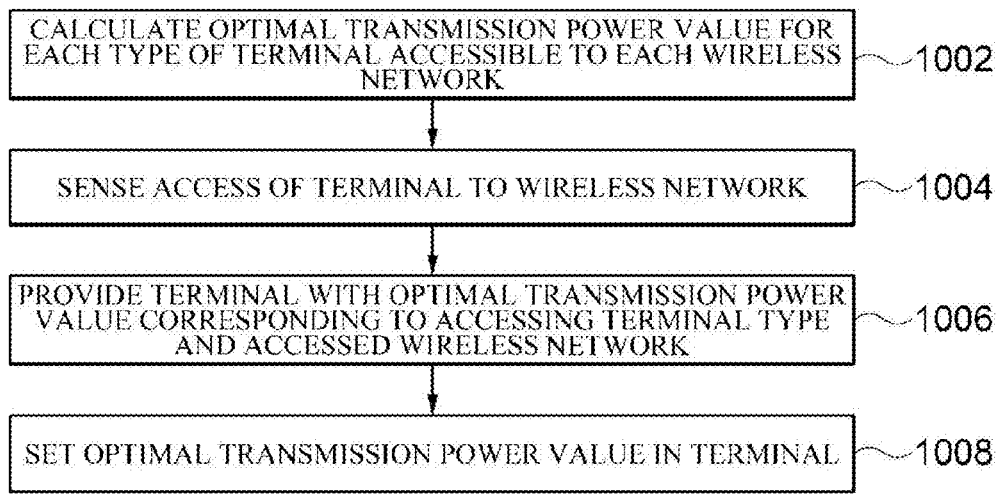
FIG. 10 is a flowchart for describing a transmission power control method 1000 of a terminal according to an embodiment of the present disclosure.

FIG. 10 is a flowchart for describing a transmission power control method 1000 of a terminal according to an embodiment of the present disclosure. The method shown in FIG. 10 may be performed by, for example, the above-described management server 110. In the illustrated flowcharts, the method will be described to have a plurality of operations. However, at least some of the operations are performed in the exchanged order, performed in combination with another operation, omitted, divided into sub-operations and then performed, or performed in addition to one or more operations that are not shown.

In operation 1002, the optimal transmission power calculation unit 202 calculates an optimal transmission power value for each type of a terminal accessible to each of one or more wireless networks. Particularly, operation 1002 may be repeatedly performed periodically, when an environment of a wireless network changes, or a new wireless terminal 106 is released, according to operating policies of a wireless network service provider operator.

In operation 1004, the transmission power setting unit 204 senses an access of a terminal to any one of the one or more networks.

In operation 1006, the transmission power setting unit 204 provides the accessing terminal with an optimal transmission power value corresponding to the accessing terminal and the wireless network accessed by the terminal.

In operation 1008, the transmission power control unit 718 of the mobile terminal 106 sets the optimal transmission power value downloaded from the transmission power setting unit 204 in the wireless communication unit 710 of the mobile terminal 106.

According to embodiments of the present disclosure, it is possible to effectively reduce power consumption of a terminal during data communication in an access network by controlling transmission power of the terminal to an optimal state according to a type of the terminal and a type of a wireless network accessed by the terminal.

In addition, according to embodiments of the present disclosure, it is possible to minimize additional power consumption for controlling transmission power at a terminal side since separate continuous communication, such as open-loop power control or closed-loop power control, with an access point or separate operations do not need to be performed, unlike an existing scheme, to control transmission power appropriate for a network currently connected to a terminal side, by previously calculating and storing an optimal transmission power value for each wireless network and each type of the terminal and providing a first one-time download of the optimal transmission power value if a first authentication of the wireless network succeeds in the terminal.

Furthermore, since the optimal transmission power value set in the terminal is usually set to be lower than a factory vale, it is possible to minimize interference in service areas of APs adjacent to a specific AP upon performing data communication with the specific AP, thus increasing a service capacity in an entire wireless network.

Embodiments of the present disclosure may include a computer readable storage medium including a program for performing methods described in this specification on a computer. The computer readable recording medium may include a program instruction, a local data file, a local data structure, or a combination thereof. The medium may be designed and configured specifically for the present disclosure or can be typically available in the field of computer software. Examples of the computer readable recording medium include a magnetic medium, such as a hard disk, a floppy disk, and a magnetic tape, an optical recording medium, such as a CD-ROM, a DVD, etc., a magneto-optical medium such as a floptical disk, and a hardware device specially configured to store and perform a program instruction, such as a ROM, a RAM, a flash memory, etc. Examples of the program instruction include a high-level language code executable by a computer with an interpreter, in addition to a machine language code made by a compiler.

Although exemplary embodiments of the present disclosure has been described in detail, it will be understood by those skilled in the art that various changes may be made without departing from the spirit or scope of the disclosure. Thus, the scope of the present disclosure is to be determined by the following claims and their equivalents, and shall not be restricted or limited by the foregoing detailed description.

What is claimed is:

1. An apparatus for controlling transmission power, the apparatus comprising at least one hardware processor to implement:
a transmission power calculation unit configured to calculate a desired transmission power value for a terminal of a type, the terminal being accessible to one or more wireless networks; and
a transmission power setting unit configured to, when an access of the terminal to at least one of the one or more wireless networks is sensed, provide the terminal with desired transmission power values corresponding to the terminal and the wireless network accessed by the terminal,
wherein the transmission power calculation unit is further configured to calculate a desired transmission power value for each of one or more access points included in a specific wireless network selected from among the one or more wireless networks, and to calculate a desired transmission power value of the specific wireless network from the calculated desired transmission power value for each access point,
wherein the transmission power calculation unit is further configured to measure a service area of a specific access point selected from among the one or more access points using a forward transmission quality between a test terminal and the specific access point, and to calculate a minimum transmission power value at which the test terminal is configured to enable communication in the service area using a reverse transmission quality between the test terminal and the specific access point,
wherein the transmission power calculation unit is further configured to measure a plurality of forward transmission qualities while moving the test terminal in a preset plurality of directions from one point on a ground closest to the specific access point, to select a plurality of communication points corresponding to the plurality of directions from the measured plurality of forward transmission qualities, and to set the service area of the specific access point based on the selected plurality of communication points.

2. The apparatus of claim 1, wherein the plurality of communication points comprise a point farthest from the specific access point while the measured forward transmission quality is such that a preset forward transmission quality service level value is met.

3. The apparatus of claim 1, wherein the transmission power calculation unit is further configured to repeatedly measure the forward transmission quality while moving the test terminal, and to select a communication point in a direction through a mathematical operation of the measured forward transmission qualities.

4. The apparatus of claim 3, wherein the mathematical operation includes calculating one or more of a minimum value, a maximum value, a median value, an arithmetic mean value, a geometric mean value, and a harmonic mean value of one or more of the measured forward transmission qualities.

5. The apparatus of claim 1, wherein the transmission power calculation unit is further configured to measure a plurality of a reverse transmission qualities for each communication point while changing transmission power values of the test terminal at the plurality of communication points defining the service area, to calculate a plurality of communication transmission power values from the measured reverse transmission quality for each communication point, and to calculate a minimum transmission power value at which the test terminal is configured to enable communication in the specific access point through a mathematical operation of the calculated plurality of communication transmission power values.

6. The apparatus of claim 5, wherein the plurality of communication transmission power values comprise a transmission power value closest to a preset reverse transmission quality service level value while the measured reverse transmission quality is such that the preset reverse transmission quality service level value is met.

7. The apparatus of claim 5, wherein the transmission power calculation unit is further configured to repeatedly measure the reverse transmission quality according to a transmission power value of the test terminal at one point, and to calculate a communication transmission power value of the one point through a mathematical operation of the reverse transmission qualities repeatedly measured at the one point.

8. The apparatus of claim 7, wherein the mathematical operation of the reverse transmission qualities of the same point includes calculating one or more of a minimum value, a maximum value, a median value, an arithmetic mean value, a geometric mean value, and a harmonic mean value of one or more of the repeatedly measured reverse transmission qualities.

9. The apparatus of claim 7, wherein the calculation of the plurality of communication transmission power values includes calculating one or more of a minimum value, a maximum value, a median value, an arithmetic mean value, a geometric mean value, and a harmonic mean value of one or more of the plurality of communication transmission power values.

10. The apparatus of claim 6, wherein when a maximally increased transmission power value of the test terminal is not such that the preset reverse transmission quality service level value is met, the transmission power calculation unit is configured to change at least one of a transmission power of the specific access point and a forward transmission quality service level value, and to recalculate a minimum transmission power value at which the test terminal is configured to enable communication in consideration of the change.

11. The apparatus of claim 1, wherein the transmission power calculation unit is further configured to set a maximum value of calculated desired transmission power values for respective points as the desired transmission power value of the specific wireless network.

12. The apparatus of claim 1, wherein when there is a multi-band wireless network capable of providing a service over a plurality of frequency bands among the one or more wireless networks, the transmission power calculation unit is configured to calculate a desired transmission power value for each type of the terminal and each service frequency band of the multi-band wireless network.

13. The apparatus of claim 12, wherein when a specific terminal accesses the multi-band wireless network, the transmission power setting unit is configured to provide the specific terminal with desired transmission power values of the multi-band wireless network corresponding to a frequency band currently accessed by the specific terminal or corresponding to an frequency bands supported by specific terminal.

14. A method of controlling transmission power, the method comprissing:
calculating, by a transmission power calculation unit, desired transmission power value for a terminal of a type, the terminal being accessible to one or more wireless networks; and
when an access of the terminal to at least one or the one or more wireless networks is sensed, providing, by a transmission power setting unit, the terminal with desired transmission power values corresponding to the terminal and the network accessed by the terminal,
wherein the calculating of the desired transmission power value comprises:
calculating desired transmission power value for each of one or more access points included in a specific wireless network selected from among the one or more wireless networks; and
calculating a desired transmission power value of the specific wireless network from the calculated desired transmission power value for each access point,
wherein the calculating of a desired transmission power value for each of one or more access points comprises:
measuring a service area of a specific access point selected from among the one or more access points using a forward transmission quality between a test terminal and the specific access point; and
calculating a minimum transmission power value at which the ten terminal is configured to enable communication in the service area using a reverse transmission quality between the test terminal and the specific access point,
wherein the measuring of a service area of the specific access point further comprises measuring a plurality of forward transmission qualities while moving the test terminal in a specific direction from one point on a ground closest to the specific access point and selecting a communication point in the specific direction from the. measured plurality of forward transmission qualities,
wherein the transmission power calculation unit repeatedly performs selecting of the communication point with respect to each of a preset plurality of directions and sets the service area based on the selected plurality of communication points, and
wherein the transmission power calculation unit and the transmission power setting unit are implemented by using at least one hardware processor.

15. The method of claim 14, wherein the plurality of communication points comprise a point farthest from the specific access point while the measured forward transmission quality is such that a preset forward transmission quality service level value is met.

16. The method of claim 14, wherein the selecting of the communication point comprises repeatedly measuring the forward transmission quality while moving the test terminal, and selecting a communication point in a direction through a mathematical operation of the measured forward transmission qualities.

17. The method of claim 16, wherein the mathematical operation includes calculating one or more of a minimum value, a maximum value, a median value, an arithmetic mean value, a geometric mean value, and a harmonic mean value of one or more of the meassured forward transmission qualities.

18. The method of claim 14, wherein the calculating of a minimum transmission power value at which the test terminal is configured to enable communication further comprises measuring the reverse transmission quality while changing a transmission power value of the test terminal at a specific point among the plurality of communication points defining the service area, and calculating a communication transmission power value at the specific point from the measured reverse transmission quality,
wherein the transmission power calculation unit performs the calculating of the communication transmission power value at one or more points defining the service area and calculates a minimum transmission power value at which the test terminal is configured to enable communication in the access point through a mathematical operation of a plurality of transmission power values calculated through the repeated performing thereof.

19. The method of claim 18, wherein the communication transmission power value comprises a transmission power value closest to a preset reverse transmission quality service level value while the measured reverse transmissions quality is such that the preset reverse transmission quality service level value is met.

20. The method of claim 18, wherein the calculating of the communication transmission power value comprises repeatedly measuring the reverse transmission quality according to the transmission power value of the test terminal at one point, thereby producing a plurality of reverse transmission qualities, and calculating a communication transmission power value of the point through a mathematical operation of the reverse transmission qualities repeatedly measured at the one point, thereby forming a plurality of communication transmission power values.

21. The method of claim 20, wherein the mathematical operation of the reverse transmission qualities of the same point includes calculating one or more of a minimum value, a maximum value, a median value, an arithmetic mean value, a geometric mean value, and a harmonic mean value of one or more of the repeatedly measured reverse transmission qualities.

22. The method of claim 20, wherein the calculation of the plurality of communication transmission power values includes calculating one or more of a minimum value, a maximum value, a median value, an arithmetic mean value, a geometric mean value, and a harmonic mean value of one or more of the plurality of communication transmission power values.

23. The method of claim 19, wherein when a maximally increased transmission power value of the test terminal is not such that the preset reverse transmission quality service level value is met, the transmission power calculation unit changes at least one of a transmission power of the specific access point and a forward transmission quality service level value, and recalculates a minimum transmission power value at which the test terminal is configured to enable communication in consideration of the change.

24. The method of claim 14, wherein the calculating of a desired transmission power value of the specific wireless network comprises setting a maximum value of calculated desired transmission power values for respective access points as the desired transmission power value of the specific wireless network.

25. The method of claim 14, wherein when there is a multi-band wireless network capable of providing a service over a plurality of frequency bands among the one or more wireless networks, the transmission power calculation unit calculates a desired transmission power value for each type of the terminal and each service frequency band of the multi-band wireless network.

26. The method of claim 25, wherein when a specific terminal accesses the multi-band wireless network, the transmission power setting unit provides the specific terminal with desired transmission power values of the multi-band wireless network corresponding to a frequency band currently accessed by the specific terminal or corresponding to all frequency bands supported by the specific terminal.

\* \* \* \* \*